June 5, 1945.

O. M. MILLER 2,377,509

OPTICAL SYSTEM

Filed Feb. 12, 1943

INVENTOR
OSBORN M. MILLER
BY
M Philip Churchill
ATTORNEY

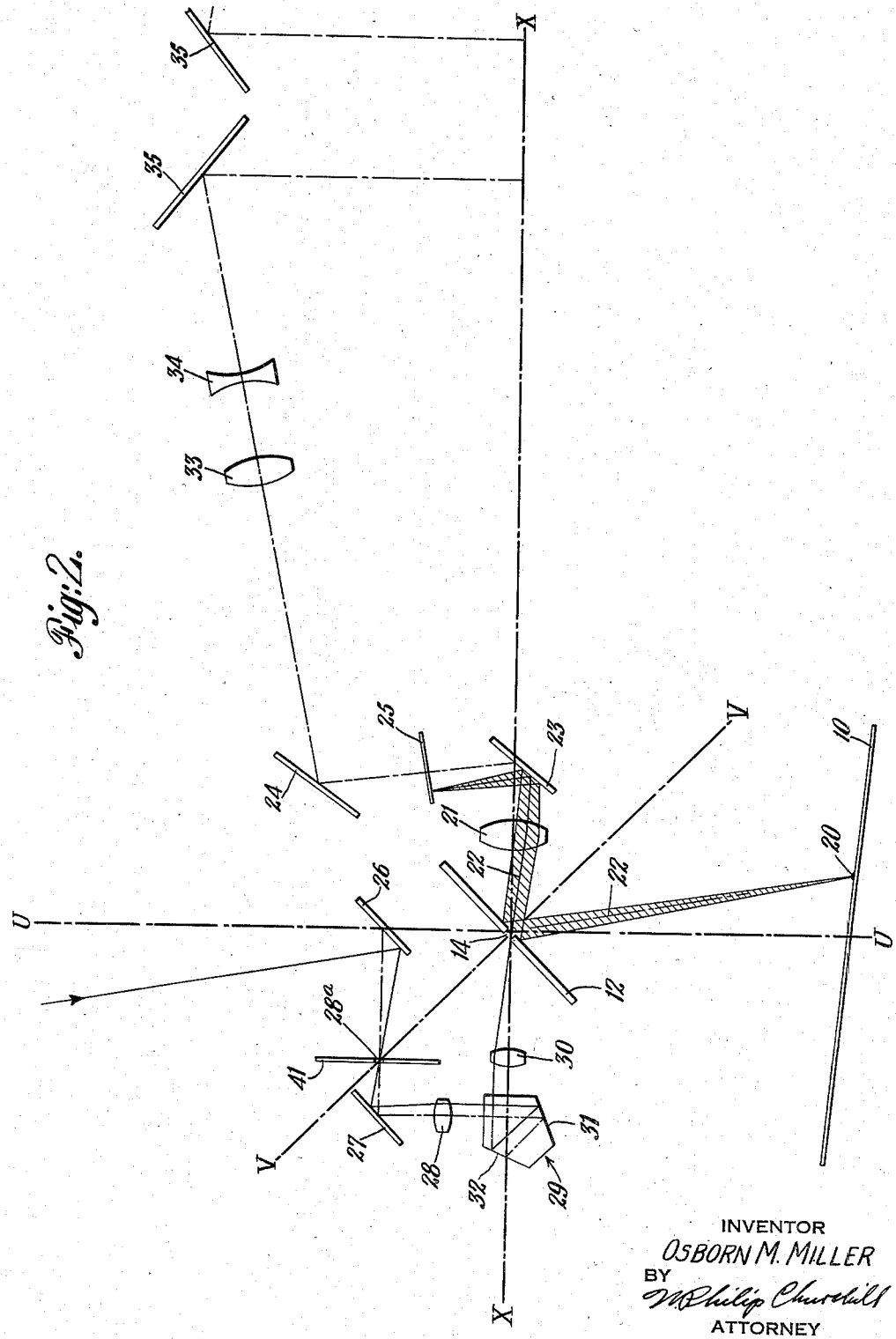

Patented June 5, 1945

2,377,509

UNITED STATES PATENT OFFICE 2,377,509

OPTICAL SYSTEM

Osborn M. Miller, New York, N. Y., assignor to American Geographical Society, New York, N. Y., a corporation of New York Application February 12, 1943, Serial No. 475,596

5 Claims. (Cl. 88—29)

This invention relates to an optical system for merging rays of light from a movable light source or index mark with a reflected image of an object so that the index mark appears to be superimposed on the object and can be made to move about thereon. More particularly, the invention is concerned with an optical system for a device that is adapted to view an object or photograph and move an index marker over the surface of the object or photograph for recording or indicating contours or other relationships of points on the object or photograph.

Various methods and devices have been proposed heretofore for viewing aerial photographs taken from separated positions to produce a stereoscopic effect, and by means of an index mark of some type plotting the relationship of different points on the stereo image to each other. One such device, which may be used for plotting contour maps by means of a pair of index marks that appear to fuse and move about over the surface represented in the photograph, is described in Miller Patent No. 1,985,260. In this device, a beam of light from an illuminated index mark is passed directly through a pinhole in a mirror and thereby merged with an image reflected by the mirror.

It is particularly desirable, however, in a device of this character to view only a small section of a photograph at one time so that this section with the index mark on it can be magnified and greater accuracy can be obtained in the plotting. Such an accomplishment requires a system that can be adjusted to view different portions of the object successively.

This invention accomplishes this and other objects by providing for the proper merging of an index mark derived from a light source with a reflected image of a photograph or other object being viewed, and providing for the scanning of the photograph so that only a small portion of it may be viewed at one time, and this portion may be suitably magnified.

Accordingly, an object of this invention is the provision of means for merging a luminous index mark with a reflected image of an object in such a manner that different portions of the object may be viewed successively.

A further object of the invention is the provision of such a combination in which a merged index mark and image of one portion of an object are magnified as viewed by the eye.

Another object is the provision of such a system in which different portions of the object may be viewed without changing the apparent relationship of the index mark to the surface of the object viewed.

Still another object of the invention is to provide a device of the character described in which a pair of objects, such as aerial photographs of the same terrain taken from different points, may be viewed simultaneously to produce a stereoscopic effect.

A further object is the provision of such a device in which the photographs or other objects viewed may be oriented and remain in a fixed position during scanning, and different portions of these photographs or objects may be viewed with suitable magnification through eye pieces that remain fixed during scanning.

Other objects will be apparent from the following description, or will be specifically mentioned in connection therewith. For purposes of illustration, the invention will be described as embodied in a binocular system arranged for viewing two aerial photographs taken from different points, but showing at least in part, the same terrain.

In the dawings:

Fig. 2 is a diagrammatic plan view, on a larger scale, of the optical system used for inverting and merging light from an index mark with the reflected image from a photograph.

Figure 1:
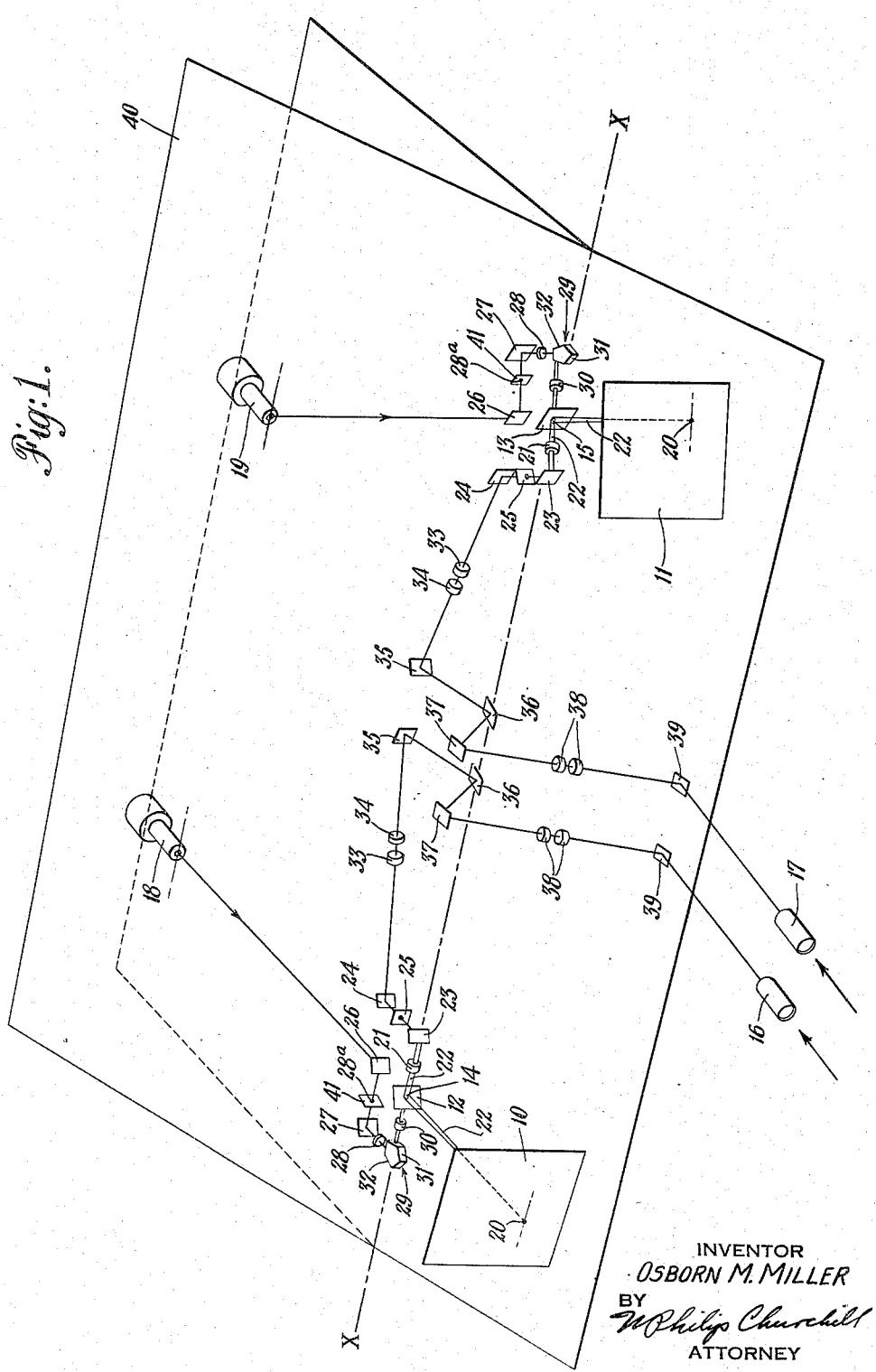
Fig. 1 is a diagrammatic perspective view of such a binocular optical system for merging light beams from index marks with the reflected images of two photographs so that the photographs may be viewed simultaneously to give the appearance of a three-dimensional picture with a single luminous index mark superimposed on the picture.

Referring to the device illustrated in Fig. 1, a pair of photographs 10 and 11 are mounted in suitable holders in a position facing towards an imaginary axis X—X which is horizontal and positioned in a horizontal plane that would cut approximately through a central portion of the photographs 10 and 11.

These photographs should be suitably oriented relative to each other and to the axis, as will be understood by those skilled in the art. This may be accomplished, for example, in the manner described in said Miller Patent No. 1,985,260, or as described in the copending application of Theodore M. Edison, Serial Number 496,611, filed July 29, 1943. These photographs face towards a pair of mirrors 12 and 13 respectively, provided with central openings 14 and 15 and arranged so that the axis X—X passes through these openings 14 and 15. In orienting the photographs 10 and 11, they are adjusted so that they occupy the same relative positions with respect to each other and to the axis X—X that the exposed films in the cameras occupied at the moment of exposure with respect to themselves and to the line between the two camera stations.

These mirrors 12 and 13 are disposed at such an angle as to reflect light rays from portions of the pictures 10 and 11 through a system of mirrors and lenses to the respective eye pieces 16 and 17, as will be more fully described below. These reflected images are merged at the mirrors 12 and 13 with light beams from index marks 18 and 19 which are collected, inverted and converged to pass through the openings 14 and 15 in the mirrors 12 and 13, respectively. It will be noted that the respective index marks, openings in the mirrors and photographs are in line with each other. Thus the openings 14 and 15 are actually perspective centers for the two systems. The openings 14 and 15 are preferably elliptical in shape so that they will appear round at the angle at which the light rays from marks 18 and 19 pass through the mirrors 12 and 13.

The index marks 18 and 19 may be any suitable source of a point of light. As will be understood by those skilled in the art, this light beam may be provided by concentrating light from a lamp or other light source with a lens, and passing it through a small opening in an otherwise opaque plate or diaphragm.

Referring now more particularly to the systems for collecting light from the index marks and merging it with the reflected images from the pictures, Figure 2 illustrates simply the arrangement for merging light from the index mark 18 with the reflected image from the picture 10, and it will be understood that a complemental arrangement of parts is provided for merging light from the mark 19 with the reflected image from the picture 11. A description of one of these merging systems, therefore, should suffice for an understanding of their construction and principles of operation.

As previously mentioned, the mirror 12 is positioned in a plane at say an angle of 45° to the axis X—X. This angle is variable as will be explained and does not have to be exact, but 45° is convenient for purposes of illustration. Rays of light from a given point 20 on the picture 10 diverge until they strike the surface of the mirror 12, and still diverging, are reflected by this mirror to pass through the lens 21 which is arranged so that the axis X—X passes through its center and coincides with its focal axis when the mirror 12 is at an angle of 45° to this axis. Thus light rays, as shown by the cross-hatched lines 22 are converged by this lens 21 and strike a mirror 23, also arranged on the axis X—X when the mirror 12 is at 45° thereto, and parallel to the mirror 12, which reflects the rays to a mirror 24.

The focal length of the lens 21 and the relative distances of lens 21 and mirrors 23 and 24 from each other are so adjusted that the converging rays reach a point between the mirrors 23 and 24 forming a real image in the plane of the line 25. As will be explained hereinafter, the mirror 24 is arranged so that its plane always points toward the opening 14 or in other words towards the perspective center of the system.

The light from index mark 18 is collected by a mirror 26 arranged so that it is parallel to the mirror 12, on the axis U—U which is at right angles to the axis X—X, and in line to intercept all rays from the mark 18 that otherwise would strike directly the opening 14 in mirror 12. The rays collected by mirror 26 are reflected through a system of mirrors and lenses which inverts them and converges them to pass through the opening 14 along the line of the axis X—X.

For ease of description, reference may be made to the axis V—V which is in the same plane with the axes X—X and U—U, but disposed at an angle of 45° to each of them. A mirror 27 is arranged parallel to the mirrors 26 and 12, but to the left of the axis V—V so that light from the index mark 18 striking the mirror 26 is reflected to the mirror 27 by passing through the point 28a on the axis V—V.

This reflected and diverging beam of light is directed from the mirror 27 through a lens 28 and a pentagon prism 29 to the lens 30. The lens 28 is suitably designed and positioned with respect to the focal point 28a to render the diverging rays parallel as they leave this lens. These parallel rays are then reflected successively by the mirrored surfaces 31 and 32 of the pentagon prism 29. It will be apparent that a pair of mirrors may be used in place of the mirrored surfaces 31 and 32 of this pentagon prism, if desired. The parallel rays reflected by the surface 32 pass through the lens 30 which converges them to a point at the perspective center or opening 14 in the mirror 12.

The use of the lenses 28 and 30 coupled with an even number of mirrors provides for the desirable inversion of light from the index mark before it is merged with the reflected, and thereby inverted, image of the object viewed.

The merged image and light rays from the index mark are now carried through the lens 21 to the mirror 23, and thence to the mirror 24 in a merged form. From the mirror 24, this image is reflected through a pair of magnifying lenses 33, 34 to the mirror 35 which reflects the rays to the normally horizontal mirror 36 disposed on the axis X—X (Fig. 1), and thence to the mirror 37 through suitable telescope lenses 38 to mirror 39 and the eye piece 16.

It will be apparent that the merged light rays from the index marks and pictures arrive at the eye pieces 16 and 17 in a completely inverted form, i. e., inverted from top to bottom, and also inverted from side to side. By the use of conventional eye pieces, this completed inverted image is transformed into a proper erect image. Various devices and telescope or periscope systems may be used to bring the superimposed index mark and image to the eye pieces with suitable magnification once the two are merged in the proper relationship to each other. And, of course, suitable adjustments can readily be provided for focusing the eye pieces individually and moving them farther apart or closer together to suit the eyes of different observers.

The optical merging system just described is arranged in such a manner that it can be moved to scan the pictures both laterally by moving from side to side across the photograph or other object, and vertically by moving up and down over the photograph or object. The movements of the optical system for accomplishing this result are independent of any movement of the index markers 18 and 19, and as the optical system is moved to view a different portion of the photographs, the position of the light spots from the index markers may be made to appear stationary or fixed on the same portion of the terrain shown in the photograph.

The index marks 18 and 19 are preferably movable simultaneously in three dimensions independently of the optical system, and suitable apparatus for co-ordinating this movement to keep the line between the index marks parallel to the axis X—X is described in said co-pending Edison application. Another form of mechanism for moving the index marks 18 and 19 is described in said Miller Patent No. 1,985,260. It will be obvious that various other mechanisms can be employed for adjusting the position of these markers and for operating a stylus to plot contour or make other lines upon a map or sheet of paper, or to operate suitable other recording or indicating devices. The specific mechanism for moving these marks and operating recording or indicating devices in accordance with the movement of the marks forms no part of this invention.

The optical merging system, including the mirrors 26, 27, 12 and 23, the prism 29 and the lenses 28, 30 and 21 are mounted in fixed relation to each other so that all have their planes or geometrical axes vertical to an imaginary plane illustrated in Fig. 1 as the plane 40. This plane may be considered for convenience as the optical plane of the system and is rotatable about the horizontal axis X—X which passes through the perspective centers 14 and 15. Actually these elements may all be mounted on a suitable frame that is rotatable about the horizontal axis X—X. The mirrors 24 and 35 and the lenses 33 and 34 are also supported in such a way as to remain vertical with respect to the plane 40 and to be rotatable about the axis X—X when the other elements in this plane are rotated.

It will be apparent, therefore, that as the mirrors 12 and 13 and the other mirrors and lenses associated with them in the optical plane 40 are tilted and moved to rotate about the axis X—X simultaneously, the mirrors 12 and 13 are capable of receiving rays from different portions of the photographs 10 and 11 nearer the top or nearer the bottom of the photographs in accordance with the amount and direction of this rotation. In other words, the mirrors 12 and 13 are made to scan the photographs 10 and 11 from top to bottom or bottom to top by the rotation of these various elements mounted in the optical plane 40 about the axis X—X.

At the same time, the mirrors 36 which are mounted in line with the axis X—X to reflect rays from the mirrors 35 up to the mirrors 37 may be rotated about the axis X—X for half the angle of rotation of the optical plane 40. The mirrors 36 are thus always in position during any vertical scanning of the photographs to reflect rays from the mirrors 35 to the fixed mirrors 37, and these rays picked up by the fixed mirrors 37 are, of course, transmitted back to the fixed eye pieces 16 and 17 by means of the fixed lenses 38 and the fixed mirrors 39.

It has been mentioned that this optical system provides for scanning the photographs laterally or from side to side. This may be understood better by reference to Fig. 2. The mirrors 26, 27, 12 and 23 have been stated to be fixed relative to each other along with the prism 29 and the lenses 28, 30 and 21. These elements, however, are rotatable as a single unit about an axis passed through the perspective center 14 perpendicular to the optical plane 40. This provides for rotation of the mirror 12 about an upright axis passing through its center to reflect rays from one side of the picture or from the other side. Movement of the other elements along with the mirror 12 provides, of course, for the scanning of the picture from side to side without disturbing the merging relationship of the image and light rays from the index mark picked up by the mirror 26.

In order to transmit the merged image back to the fixed eye pieces 16 and 17, however, the mirror 24 must have an accompanying automatic movement equivalent to rotation of the mirror about the upright axis passed through point 14 of half the angular extent of the rotation of the mirror 12 and related parts. The lenses 33, 34 and mirror 35 are not affected by this operation and remain in position to pass the rays of the merged image through the telescope system to the eye pieces 16 and 17. The magnifying lenses 33, 34 may be adjusted, however, along their optical axes, which coincide, to provide for suitable magnification and focus of the reflected image before it is passed back to the eye pieces.

It is apparent that the lateral scanning arrangement may be operated independently for each system that scans a separate photograph. Thus rotation of the mirror 13 about an upright axis may be made entirely independently of the rotation of the similar mirror 12. In fact, independent adjustment of this nature is desirable, because of the possible three dimensional character of the terrain shown in the photographs. This independent adjustment makes it easier for the operator to adjust the images from the two different photographs to coincide with each other and produce stereoscopic coincidence.

The vertical scanning is effected by a coordinated simultaneous adjustment of both optical systems mounted in the optical plane 40.

By reason of the inverting and merging system described, it is possible to view different portions of the photographs without having the luminous index mark appear to move. Of course, if the scanning adjustments are sufficiently large, this mark may no longer appear in the field of vision and have to be brought into view again by actual movement of the light sources 18 and 19. The two adjustments are entirely independent of each other, however, so that plotting a given contour need not be interrupted or complicated by scanning adjustments of the optical system.

While reference has been made to the use of the described optical system for plotting contours on a map or sheet of paper in accordance with movement of the index marks 18 and 19 which are controlled by the operator so that they appear to move over a selected portion of the terrain shown in photographs, it will be apparent to those skilled in the art that the optical system is suitable and adapted for merging light from a single light source with rays from a selected portion of any object and still providing for vertical and lateral scanning of the photograph or other object. The system can also be used advantageously either as a simple monocular system or as the binocular system illustrated to obtain stereoscopic effects.

It may be desirable, although it is not essential, to improve the definition of the luminous index marks by providing suitable diaphragms or other opaque members 41 having a pinhole therein between the mirrors 26 and 27. If these members are employed, they should be mounted in fixed relation to the mirrors 26 and 27 so that they are normal to a line connecting the centers of the mirrors and the pinhole is on the axis V—V which is in the optical plane 40. The diaphragms 41, of course, are supported to move with the mirrors 26 and 27 so as to maintain this same relation position.

Another feature that may be used in a binocular system to good advantage is the provision of a suitable reticle in each half of the system mounted in the plane of the real image 25. Such reticles may be transparent except for a small mark of any suitable shape which may be used as an aid in bringing the images of two photographs into stereoscopic coincidence. For example, the mark on the reticle in the left hand system may be in the form of the left portion of a cross, and the mark on the reticle in right hand system may be in the form of the right portion of a cross. Thus, when these two marks are brought together to appear as a single cross, the photographs will be in stereoscopic coincidence.

It will be understood, of course, that the various systems of mirrors and lenses described herein are preferably enclosed within suitable housings in order to operate efficiently.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In an optical system for viewing an object with a luminous index mark superimposed on the image thereof, a light source, a mirror for reflecting light from the object and having an opening therein in line with said light source and the portion of the object to be viewed, means for intercepting and reflecting light from said source before it reaches said opening, and means for directing said intercepted light in an inverted form through said opening in the direction of travel of light from the object that is reflected by said mirror, said mirror and said intercepting and directing means being rotatable about an axis passing through said opening.

2. In an optical system for viewing an object with a luminous index mark superimposed on the image thereof, a light source, a mirror for reflecting light from the object and having an opening therein in line with said light source and the portion of the object to be viewed, means for intercepting and reflecting light from said source before it reaches said opening, and means for directing said intercepted light in an inverted form through said opening in the direction of travel of light from the object that is reflected by said mirror, said mirror and said intercepting and directing means being rotatable about relatively upright and horiontal axes passing through said opening.

3. In an optical system for viewing an object with a luminous index mark superimposed on the image thereof, a light source, a mirror for reflecting light from the object and having an opening therein in line with said light source and the portion of the object to be viewed, means for intercepting and reflecting light from said source before it reaches said opening, means for directing said intercepted light through said opening in the direction of travel of light reflected by the mirror to merge therewith, and means for transmitting the merged light from said mirror to a relatively fixed eye piece, said mirror and said intercepting and directing means being rotatable about an axis passing through said opening.

4. In an optical system for merging light rays from different sources, an object to be viewed, a mirror for reflecting light from the object, said mirror being provided with an opening therein and being rotatable about an axis passing through said opening, a light source, means for collecting, inverting and merging light from said source with light from said object reflected by said mirror, and means for magnifying and transmitting the merged light to a relatively fixed eye piece.

5. In a stereoscopic device for viewing a pair of photographs, mirrors arranged to reflect light from the photographs, said mirrors having openings therein and being rotatable about an axis passing through said openings, means for inverting and directing light from a light source through said openings to merge with light reflected by the mirrors, and telescope systems for magnifying and transmitting the merged light to a pair of eye pieces.

OSBORN M. MILLER.